(12) United States Patent
Paltin et al.

(10) Patent No.: US 12,557,091 B2
(45) Date of Patent: Feb. 17, 2026

(54) PHYSICAL LAYER PROCESSING TIME PREDICTION IN ADVANCED COMMUNICATION NETWORKS

(71) Applicant: Dell Products L.P., Round Rock, TX (US)

(72) Inventors: Evgeny Paltin, Montreal (CA); Gwenael Poitau, Montreal (CA); Hamidreza Farmanbar, Ottawa (CA); Eran Goldstein, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 406 days.

(21) Appl. No.: 18/349,291

(22) Filed: Jul. 10, 2023

(65) Prior Publication Data
US 2025/0024449 A1    Jan. 16, 2025

(51) Int. Cl.
*H04L 12/00* (2006.01)
*H04L 41/16* (2022.01)
*H04W 72/12* (2023.01)

(52) U.S. Cl.
CPC ............. *H04W 72/12* (2013.01); *H04L 41/16* (2013.01)

(58) Field of Classification Search
CPC ............................... H04W 72/12; H04L 41/16

USPC .......................................................... 370/329
See application file for complete search history.

(56) References Cited

U.S. PATENT DOCUMENTS

| | | | |
|---|---|---|---|
| 2019/0041811 A1* | 2/2019 | Drees | G06N 7/01 |
| 2020/0210895 A1* | 7/2020 | Han | G16H 70/60 |
| 2024/0330759 A1* | 10/2024 | Jordan | G06F 40/30 |
| 2025/0127460 A1* | 4/2025 | Kawashima | A61B 5/7275 |

* cited by examiner

*Primary Examiner* — Frantz Coby
(74) *Attorney, Agent, or Firm* — Amin, Turocy & Watson, LLP

(57) ABSTRACT

The technology described herein is directed towards having a trained artificial intelligence/machine learning (AI/ML) model provide an accurate physical layer (PHY/L1) processing time prediction that a MAC (medium access control) scheduler can use to schedule resources more efficiently. The AI/ML model is trained with large, easily obtainable datasets of configurations of tasks, to return an accurate processing time estimate based on input configuration data representing task data to be scheduled. The model can map a sequence of configurations for consecutive time slots to a sequence of expected processing times for each slot, while capturing temporal information for previously scheduled but not yet processed tasks, making it possible to optimize task execution sequences by choosing an optimal permutation for configurations/tasks. A real time scheduler can test multiple task hypotheses to select the most optimal one for a time slot.

20 Claims, 10 Drawing Sheets

PHYSICAL LAYER PROCESSING TIME PREDICTION IN ADVANCED COMMUNICATION NETWORKS

BACKGROUND

In communication networks including new radio (NR) and other, the physical layer (PHY) is at the lowest level of the protocol stack. In NR, the physical layer supports downlink and uplink communications between a user equipment (UE) and a gNodeB (gNB), and sidelink (UE-to-UE) communications. The physical layer (e.g., implemented in a module) interfaces to the MAC (medium access control) sublayer, which is the next higher layer in the stack. The physical layer is configured by RRC (radio resource control) to provide services to the MAC layer.

The MAC layer includes a scheduler that assigns physical resources across time, frequency, spatial, and code dimensions on uplink and downlink channels. Control of the physical layer module is conducted through a messaging protocol (e.g., via the FAPI or Femto Application Platform Interface) carrying task details to be executed. Each task contains explicit directives on how downlink and uplink transmissions are encoded, enabling the physical layer module to encode and transmit downlink communications, and to receive and decode uplink communications.

The operations are real-time, whereby the MAC scheduler has to make sure that the scheduled tasks can be processed by the physical layer on time. Due to the underlying physical layer system complexity, the current, widely adopted approach is to make sure that the total processing load is below the maximum capacity that the physical layer module can handle. For example, with a typical physical layer, there is a margin of safety that targets the processing load to be below a hard limit (for example, eighty percent of the maximal load) at any given time to protect from unpredictable processing spikes or the like that can otherwise disrupt real time operation of a system.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards obtaining an accurate physical layer processing time prediction that a MAC (medium access control) scheduler can use to schedule resources more efficiently. In one implementation, an artificial intelligence/machine learning (AI/ML) model such as an AI/ML regression model is trained as a prediction model to return an accurate physical layer (PHY/L1) processing time estimate based on configuration data representing task data to be scheduled for execution.

In one implementation, the model maps a sequence of configurations for consecutive time slots to a sequence of expected processing times for each slot, where a configuration can include one or multiple tasks to be executed in a given time slot. In addition, the AI/ML model captures temporal information accounting for previously scheduled tasks that have not yet been processed, making it possible to optimize task execution sequences by choosing an optimal configurations permutation.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimizing" a task execution sequence means selecting a more optimal task execution sequence over another, rather than necessarily achieving an optimal result. Similarly, "maximize" means moving towards a maximal state (e.g., up to some processing capacity limit), not necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
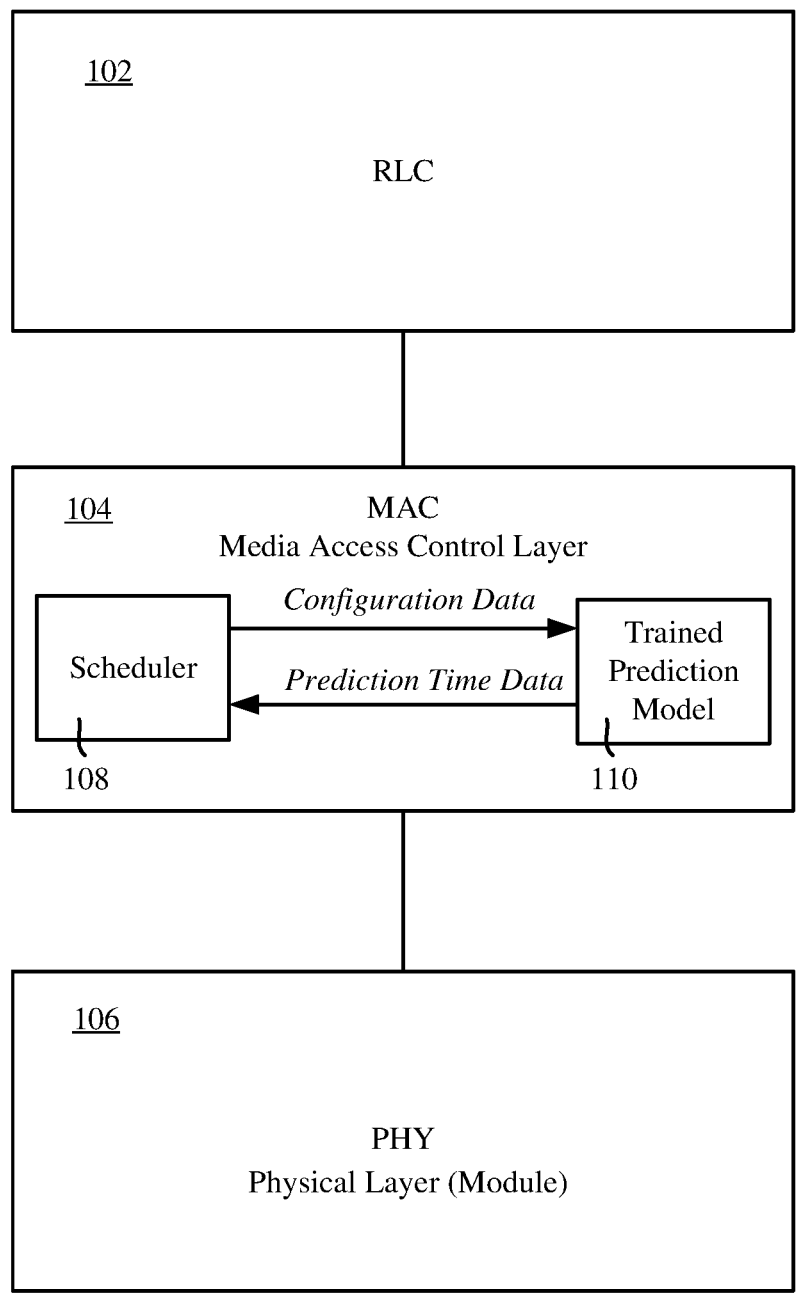
FIG. 1 is an example block diagram representation of a wireless network protocol stack, including a MAC layer with a scheduler and trained prediction model that estimates PHY layer processing time for configurations, in accordance with various aspects and implementations of the subject disclosure.

FIG. 1 is an example representation of a new radio protocol stack 100 including a radio link control (RLC) layer 102 above and interfaced to the MAC layer 104, which in turn is above and interfaced to the PHY layer 106. As described herein, the MAC layer 104 includes or is otherwise coupled to a scheduler 108, which in turn is coupled to a trained prediction model 110. The PHY layer 106 (e.g., a physical layer module) interfaces to the MAC layer 104 over a suitable (e.g., FAPI) interface. For brevity, the packet data convergence protocol (PDCP) layer above the RLC layer, and the service data adaptation protocol (SDAP) layer above the PDCP layer are not explicitly shown herein. As one example, in Open-Radio Access Network (O-RAN) new radio (NR; e.g., 5G, 6G and beyond), the SDAP and PDCP layers are in a centralized unit, while the RLC, MAC and PHY layers are in a distributed unit; however, this is only one non-limiting example implementation.

In general, and as described herein, before making task scheduling decisions, the scheduler 110 sends configuration data, corresponding to tasks that the physical layer 106 needs to execute, to the trained prediction model 110. A configuration can be one or multiple tasks to be executed at a given task execution time slot. The trained prediction model 110 returns prediction time data corresponding to estimated processing time data that the physical layer (module) 106 will need to process the tasks, e.g., on a per slot basis.

From an implementation perspective, different AI/ML regression solutions can be considered for the model, depending on system requirements and platform capabilities. This can range from more classical tools like polynomial regression, to deep neural networks (DNN).

Figure 2:
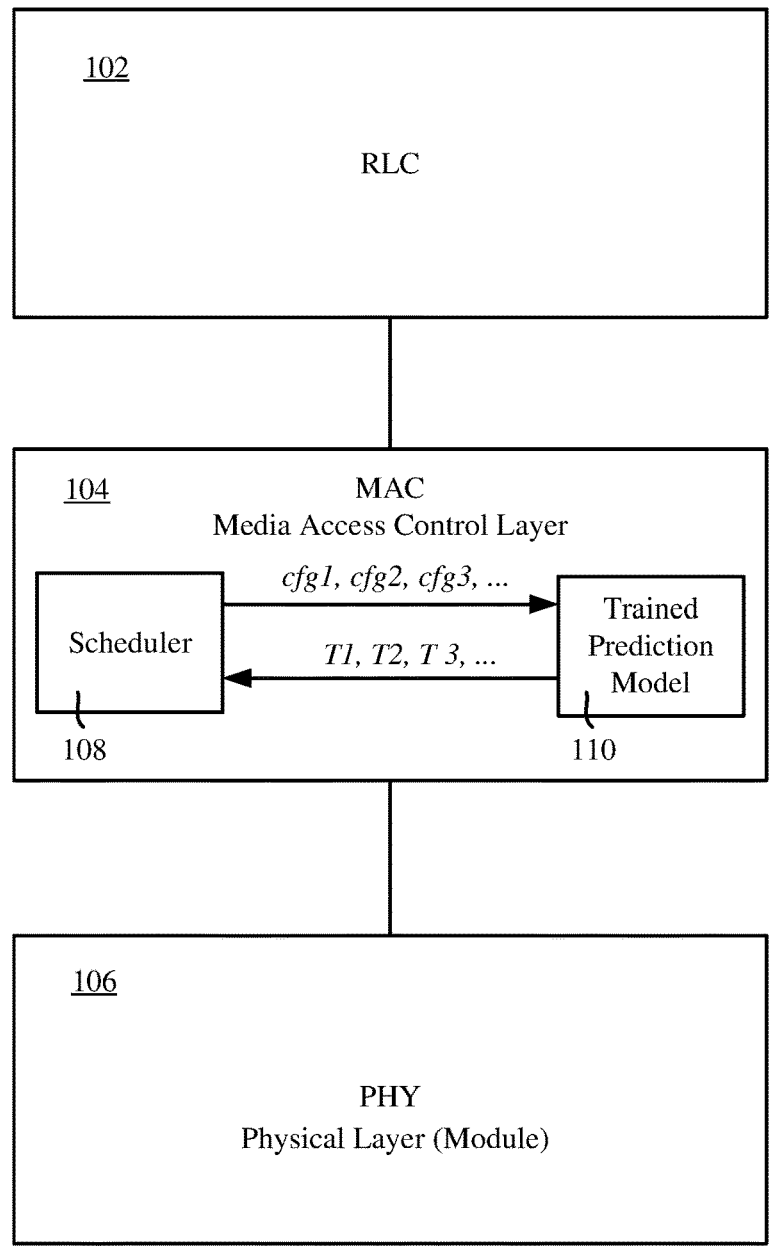
FIG. 2 is an example block diagram representation of a wireless network protocol stack, including a MAC layer with a scheduler and trained prediction model that estimates a sequence of PHY layer processing times for a sequence of configurations, in accordance with various aspects and implementations of the subject disclosure.

In one implementation shown in FIG. 2, the trained prediction model 110 maps a sequence of configurations (cfg1, cfg2, cfg3, . . . ) for consecutive time slots to a sequence of expected processing times for each slot (T1, T2, T3 . . . ). In addition, the trained prediction model 110 (e.g., with the benefit of such sequences) captures temporal information accounting for previously scheduled tasks that have not yet been processed, making it possible to optimize execution sequences by choosing an optimal configurations permutation.

With respect to configuration and task data examples, one of the widely adopted protocols used for communication between the MAC layer 104 and the PHY layers is via FAPI (Femto Application Protocol Interface) messages exchanged between the MAC layer 104. Via such messages, the MAC layer 104 provides directives/tasks to the PHY layer 106, which returns responses. Because ordinarily the base station communicates with multiple user equipment (UEs) on every slot, the MAC layer 104 issues multiple tasks every slot.

A task can be for a downlink signal generation for transmission, or for an uplink transmission reception. There are multiple physical channels and signals defined by the standards, and a separate task is issued for each.

By way of a more particular example of the type of input data that the AI/ML model is expected to receive, consider downlink scheduling using the FAPI protocol; (uplink follows a similar structure). The messages that control downlink (DL) scheduling on the slot level are carried by a DL_TTI message, (where TTI represents transmission time interval). The DL_TTI can carry multiple types of PDUs (Protocol Data Units) including multiple instances of the same type.

FAPI-defined PDU types include the following:
DL_TTI.PDCCH: carries information about Physical Downlink Control Channel
DL_TTI.PDSCH: carries information about Physical Downlink Shared Channel
DL_TTI.SSB: carries information about Synchronization Signal Block
DL_TTI.CSI_RS: carries information about Channel Status Information Reference Signal Each of the PDUs contains parameters defining how signal is being encoded and which radio resources are being used for the transmission. As described herein, on every slot, a set of PDUs can be scheduled with different types and different number of instances of each. The actual limitation of what can be scheduled on a given slot is processing capability of the PHY and available radio resources. Examples include:

Schedule data transmission towards two UEs on the same slot:
2 PDSCH PDUS
1 PDCCH PDUs Schedule data transmission towards three UEs and SSB (synchronization signal block) on the same slot:
3 PDSCH PDUs
2 PDCCH PDUS
1 SSB PDU.

As is understood, accurate processing time prediction of a task or a set of tasks on a PHY system is a difficult problem when addressed using classical engineering tools like system modeling. For example, processing time depends on tasks' details, combination of tasks scheduled together, and tasks scheduled in previous slots that are still being executed by the PHY layer. On a task level for example, the main factors that impact processing time are payload size and number of allocated resources. Further, when multiple tasks are scheduled together, the multiple tasks usually share a platform's resources such as memory, bus bandwidth and hardware accelerators, making it very difficult to determine an expected processing time. In addition to the above-described complexity, previously scheduled tasks may impact execution time of newly scheduled tasks, because the previously scheduled tasks are still being processed, occupying system resources.

In sum, due to the underlying complexity of the PHY, accurate processing time estimation with classical tools requires a detailed modeling of the system. From a functionality perspective, the prediction needs to account for tasks content/configuration, combination of tasks and previously scheduled task still being processed. From a hardware perspective, factors such as cache misses, bus congestion conditions and other resources sharing may need to be considered and modeled. Further, prediction components have to be maintained and updated over time to reflect evolution of the PHY. At the same time, the MAC scheduler may need to test multiple hypotheses in real time (that is, quickly and efficiently) before arriving at a scheduling decision.

To obtain accurate processing data time estimation, described herein is an AI/ML model trained with highly relevant data that provides the MAC layer 104 with insight of the true PHY layer 106 capacity and capabilities. This allows the MAC layer 104 to more fully utilize the PHY platform resources and achieve power efficiency.

Figure 3:
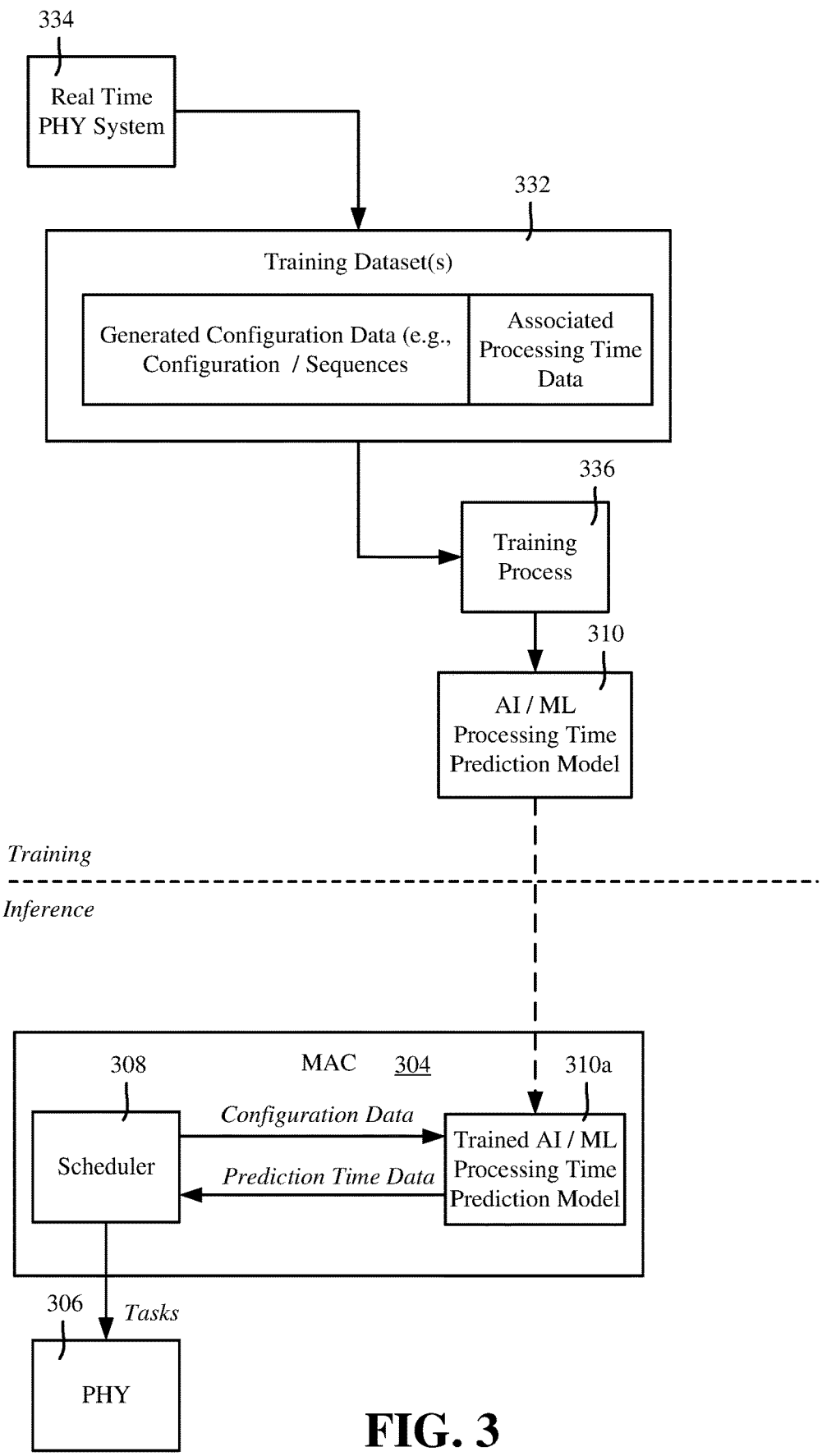
FIG. 3 is an example representation of training an AI/ML processing time prediction model, in accordance with various aspects and implementations of the subject disclosure.

Training of a model can be done based on previously generated datasets, and fine-tuned post-deployment using reinforced learning (RL) when appropriate. As shown in FIG. 3, an initial trained dataset 332 can be generated from a controlled real time PHY system 334 by feeding generated (e.g., actual scheduled) configurations (which can include sequences of configurations/tasks) into the system 334 and measuring the resulting associated processing time. A training process 336 can manage the input of the dataset(s) 332 to train an AI/ML processing time prediction model 310 that is appropriate for the capabilities of a given PHY system (e.g., maximum processing load, constraint data such as real time constraints and/or energy constraints, physical resources, hardware-related issues, and so on).

The dataset size is not limited, neither fundamentally nor in practice, because a dataset can be generated from a real time system under control. Indeed, large datasets can be generated within reasonable amount of time. For example, consider a PHY system running 30 Khz sub-carrier spacing configuration, which has 2,000 timeslots/configurations per second, which enables generation of 120,000 data points in a minute (7,200,00 in an hour).

Once trained, during inference a working instance 310a of the trained AI/ML processing time prediction model can be accessed by a real time scheduler 308. The configuration data is sent to the working instance 310a of the trained AI/ML processing time prediction model, which efficiently and quickly maps the configuration data to prediction times.

Figure 4:
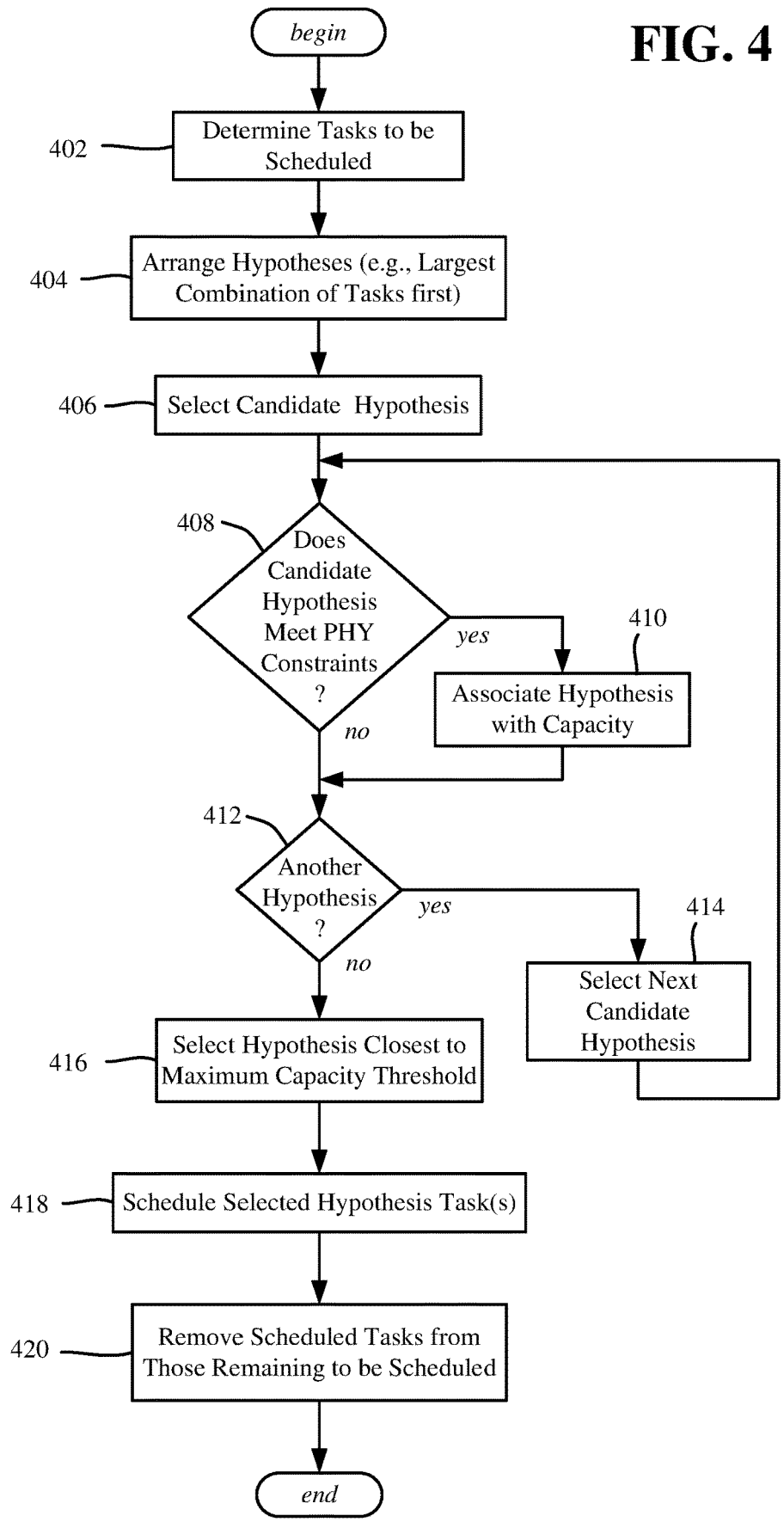
FIG. 4 is a flow diagram showing example operations related to a real time scheduler testing hypotheses (arrangements of candidate tasks) to schedule tasks, in accordance with various aspects and implementations of the subject disclosure.

As described herein with reference to FIG. 4, the efficient operation of the trained AI/ML processing time prediction model 310a allows fast (low complexity) hypotheses testing in real time by the MAC scheduler 308. Consider a case where the PHY layer's (e.g., the PHY 306) computational capacity is limited, and not every combination of tasks (transmissions and receptions) can be executed within real time and/or energy constraints. This can be due to older platform hardware, very tight latency or energy requirements (e.g., very limited time allocated for processing) or the like, possibly due to an abundance of physical resources such as very wide system bandwidth and/or large array of antennas (e.g., massive multiple-input multiple-output/ MIMO). Regardless of where the limitation comes from, a MAC scheduler 308 needs to take the constraint data into account and try to make highly efficient use of the available resources. For every timeslot, the MAC scheduler 308 needs to decide which transmissions in DL and UL are to be scheduled to occur, while operating in real time, that is, with limited time to make a decision.

To demonstrate the importance of fast (low complexity) hypotheses testing, consider that the scheduler is at a stage where the scheduler needs to decide on an arrangement of tasks (e.g., a combination) to be scheduled. In a straightforward example, assume that at this stage there are three candidate tasks A, B and C (corresponding to seven hypotheses) remaining to schedule, and each have the same priority. Thus, one remaining metric is maximal PHY resources utilization.

Because of the low complexity of the inference operation, the scheduler can test all seven hypotheses (A, B, C, AB, AC, BC, ABC) to check if they can be executed within real time/energy constraint data, and which one gets closest to max PHY capacity.

FIG. 4 shows one example of logic that a real time scheduler can use to make the scheduling decision; note that this is only one example, and the logic can be accomplished in various other ways, including with at least some parallel operations to arrive at a scheduling decision. Operation 402 represents determining the tasks to be scheduled, e.g., A, B and C in the above example.

Operation 404 represents arranging the tasks as candidate hypotheses. This can be done by putting the full combination of tasks first, because if all tasks can be scheduled in the slot (ABC in this example), there is no need to evaluate the other hypotheses. Bypassing further evaluation is not explicitly shown in FIG. 4, but is straightforward to accomplish.

Operation 404 represents selecting a candidate hypothesis from the hypotheses, e.g., the largest combination of ABC first. Operation 404 evaluates whether the candidate hypothesis meets the PHY real time and/or energy constraints, as well as not exceeding the maximal capacity threshold allowed for the PHY, e.g., close to one-hundred percent (but not necessarily at one-hundred percent, given that the model may not have been trained with some unusual configuration that would exceed the maximum PHY capacity if actually scheduled).

If the candidate hypothesis can be scheduled, operation 410 associates the selected hypothesis with a value (e.g., a percentage) of how much PHY capacity the task(s) will use if this hypotheses is scheduled. In this example, assume that ABC cannot be executed within the PHY constraint data, and thus the next arrangement, AB, is to be evaluated.

To select the next arrangement, operations 412 and 414 repeat the process for the next candidate hypothesis and so on. Consider, for example, that task set AB can be scheduled and uses eight-four percent capacity, AC can be scheduled and uses sixty-three percent capacity, and so on. As can be understood, for each hypothesis of one or more candidate tasks that can be executed within the constraints, a data structure or the like of hypothesis-to-capacity is built up during the hypotheses testing.

Once testing is complete, operation 416 selects the hypothesis that is closest to the maximum capacity threshold, e.g., uses the most PHY capacity. Operation 418 selects schedules the task(s) of the selected hypothesis, and operation 420 removes the scheduled tasks from those remaining to be scheduled. For example, if BC was the selected hypothesis (based on using the most capacity within the PHY threshold capacity limit), these are removed such that task A remains to be scheduled in a next time slot, possibly in combination with one or more other tasks. Note that some priority or other flag may be assigned to A to ensure that A gets scheduled in the next time slot rather than again being excluded from scheduling.

Turning to updating of a trained AI/ML processing time prediction model 310, reinforcement learning (RL) can be used. More particularly, when the PHY system is being updated, whether in software and/or hardware, the AI/ML model needs to reflect the change. Unless a complete overhaul of a system has taken place (in which event full training as in FIG. 3 can be performed), the initial dataset can be fine-tuned with a relatively small number of new data points. The update process can be streamlined without requiring additional engineering effort, something which would be basically impossible with a classical system modeling approach.

Figure 5:
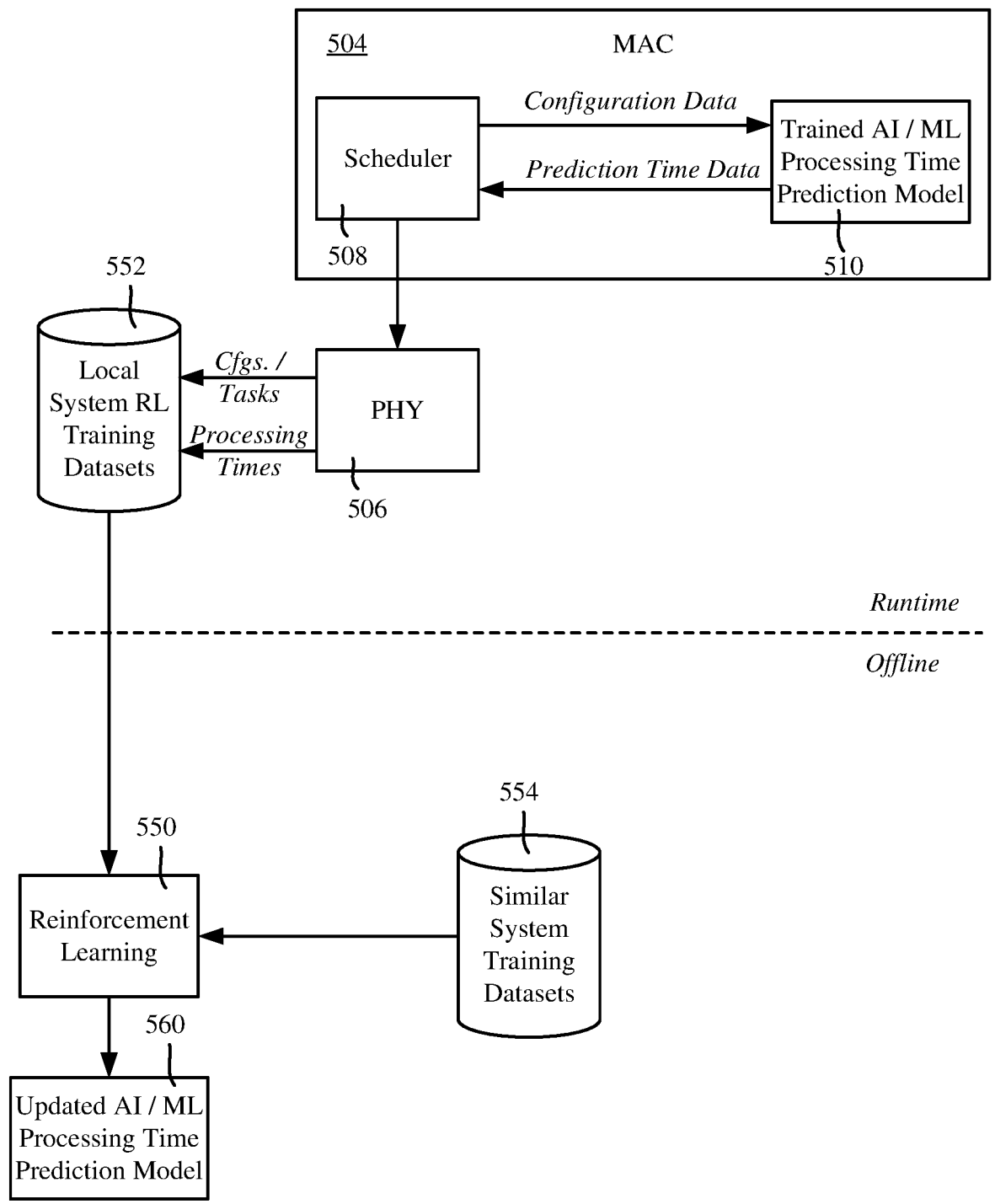
FIG. 5 is an example representation of updating an AI/ML processing time prediction model based on reinforcement learning, in accordance with various aspects and implementations of the subject disclosure.

To this end, as shown in FIG. 5, an updating process (e.g., reinforcement learning 550) can leverage local system feedback, (represented as local system RL training datasets 552) as well as feedback from similar systems (datasets 554) deployed in a network (through federated/transfer learning). During real time operation, only inference can be executed by the scheduler 508 and model 510, in which complexity is relatively low, enabling testing multiple hypotheses by the MAC scheduler 508 before arriving at a scheduling decision as described herein. However, if platform hardware and/or a network infrastructure permits, reinforcement learning 550 can be employed to leverage data generated during run-time, e.g., configurations and time take to execute at the PHY layer, as previously described.

By way of a usage example, consider an IoT (Internet of Things) use-case scenario. In the context of predicting processing time of a PHY system, IoT can be highly difficult, as an IoT system needs to manage tens or even hundreds of devices on any given timeslot. A distinct property of an IoT traffic is that a typical transmission carries a small amount of data, requiring only a small fraction of the PHY's processing capacity. However, due to the associated overhead, an IoT scenario does not scale linearly with payload, allocation size or number of IoT devices. As a result, predicting the processing time of multiple IoT transmissions taking place in the same timeslot based on the many details (as in classical modeling) is not practical. However, the prediction problem can be resolved using an AI/ML model approach as described herein, which instead of considering the many, often tiny details of the system, learns to map scheduling configurations to expected processing times given a sufficient training dataset.

Another usage example is related to O-RAN (the open-radio access network standard) overbooking deployment use-case scenarios. In one standard O-RAN deployment, each distributed unit is connected to one radio unit; however, in an 'overbooking' type of O-RAN deployment, the number of radio units exceed the number of distributed units, resulting in each distributed unit serving more than one radio unit, on average.

With overbooking, there can be a distributed unit statically allocated to a group of radio units, that is, based on based on network analysis, each distributed unit is assigned to a group of radio units that does not change over time. Alternatively, there can be distributed units dynamically allocated from a pool of distributed units to serve groups of radio units.

Each of the deployment types can benefit from high accuracy processing time prediction. When detailed profiling information is available, the safety margin can be reduced, increasing average utilization which provides benefits, in that in general, the technology described herein is able to increase coverage without increasing total network capacity.

With respect to static allocation, the technology described herein allows each distributed unit to serve more radio units because of the reduced safety margin and higher utilization of the PHY layer. With respect to dynamic allocation of distributed units from a pool of distributed unit resources to radio units, which is based on changing traffic patterns, the pool of distributed unit resources is dimensioned in advance. In the case of dynamic allocation from pool of resources, the pool size can be reduced because of more efficient utilization of resources; further, during operation, more non-assigned distributed units can be switched off, reducing average power consumption.

To summarize, the technology described herein is directed to an AI/ML model capable of accurate prediction of a PHY's processing time. This avoids having to develop and maintain an accurate model of the PHY system behavior and various details, reducing the initial implementation time, and maintenance efforts over time. An AI/ML model can be trained based on practically unlimited labeled data that is appropriate for a PHY installation. Because the AI/ML model inherently captures the finest properties of the PHY behavior, given sufficient labeled data, the AI/ML model has the potential to achieve even better accuracy than a classical system model. Once trained, in real time, a MAC scheduler can execute only inference, which has relatively low complexity, enabling testing multiple hypotheses before taking a scheduling decision. With a modeled system, due to its inherent complexity, such a mode of operation may not be feasible in real time.

Figure 6:
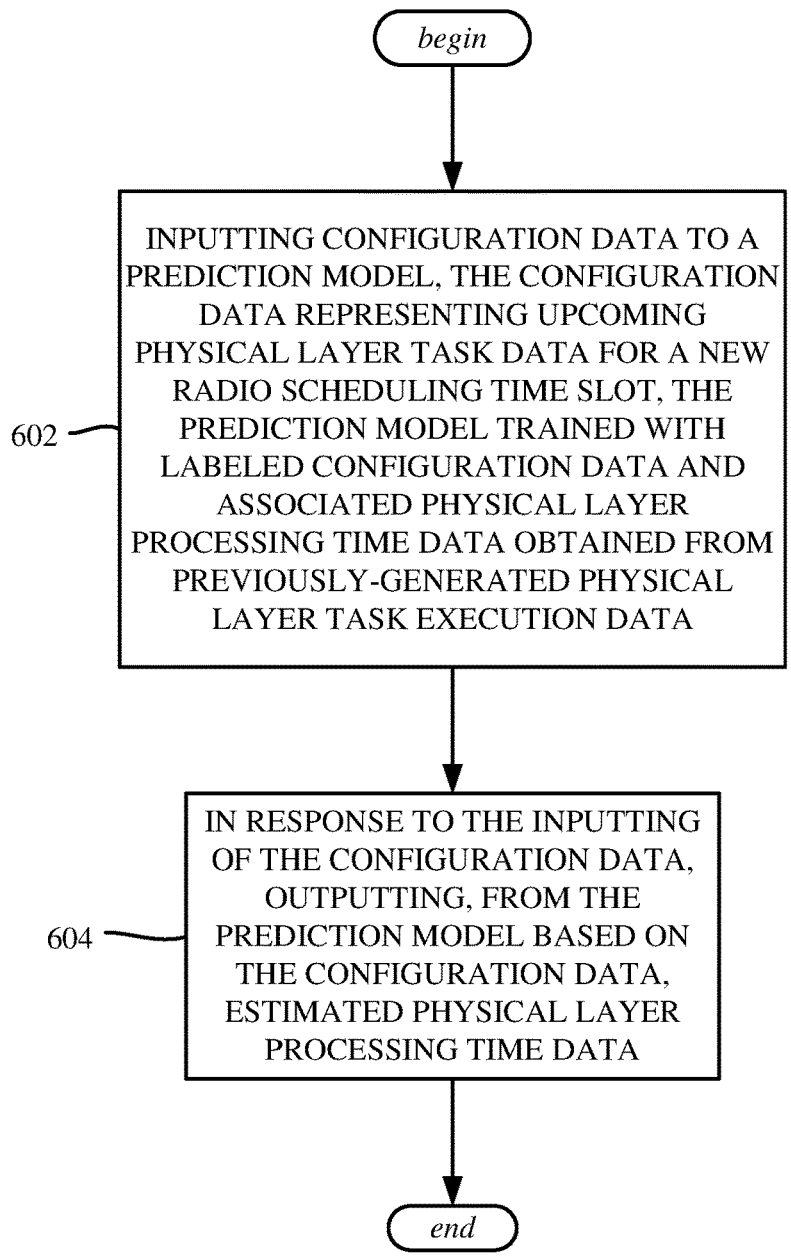
FIG. 6 is a flow diagram showing example operations related to outputting estimated physical layer processing time data from a prediction model in response to inputting configuration data, in accordance with various aspects and implementations of the subject disclosure.

One or more aspects can be embodied in a network device, such as represented in the example operations of FIG. 6, and for example can include a memory that stores computer executable components and/or operations, and a processor that executes computer executable components and/or operations stored in the memory. Example operations can include operation 602, which represents inputting configuration data to a prediction model, the configuration data representing upcoming physical layer task data for a new radio scheduling time slot, the prediction model trained with labeled configuration data and associated physical layer processing time data obtained from previously generated physical layer task execution data. Example operation 604 represents, in response to the inputting of the configuration data, outputting, from the prediction model based on the configuration data, estimated physical layer processing time data.

Outputting the estimated physical layer processing time can include determining the estimated physical layer processing time based at least in part on at least one previously scheduled task that has not yet been executed.

Inputting the configuration data can include inputting a sequence of respective configurations corresponding to respective consecutive time slots to the prediction model, and outputting of the estimated physical layer processing time data can include outputting a sequence of respective estimated physical layer processing times for the respective consecutive time slots.

Further operations can include obtaining the estimated physical layer processing time data at a scheduler, and evaluating the estimated physical layer processing time data by the scheduler to determine a scheduling decision comprising at least one task to schedule in the new radio scheduling time slot.

Evaluating the estimated physical layer processing time data can include testing a group of task execution hypotheses representing arrangements of one or more candidate tasks corresponding to the candidate data.

Testing the group of task execution hypotheses can include determining which ones of the arrangements of the one or more candidate tasks are executable within at least one of: time constraints of a physical layer, or energy constraints of the physical layer.

Testing the group of task execution hypotheses can include determining which ones of the arrangements of the one or more candidate tasks most closely approaches a capacity limit of a physical layer.

Testing the group of task execution hypotheses can include determining a subgroup of the arrangements of the one or more candidate tasks that are executable within constraints of a physical layer, and determining which ones of the subgroup of the combinations of the one or more candidate tasks most closely approaches a capacity limit of a physical layer.

The prediction model can include a regression model.

The prediction model can include a deep neural network.

Further operations can include updating the prediction model via reinforcement learning.

Updating the prediction model via reinforcement learning can include at least one of obtaining local feedback data of the network equipment generated during runtime, or obtaining non-local feedback data from at least one other data source other than data sources comprising the local feedback data.

Figure 7:
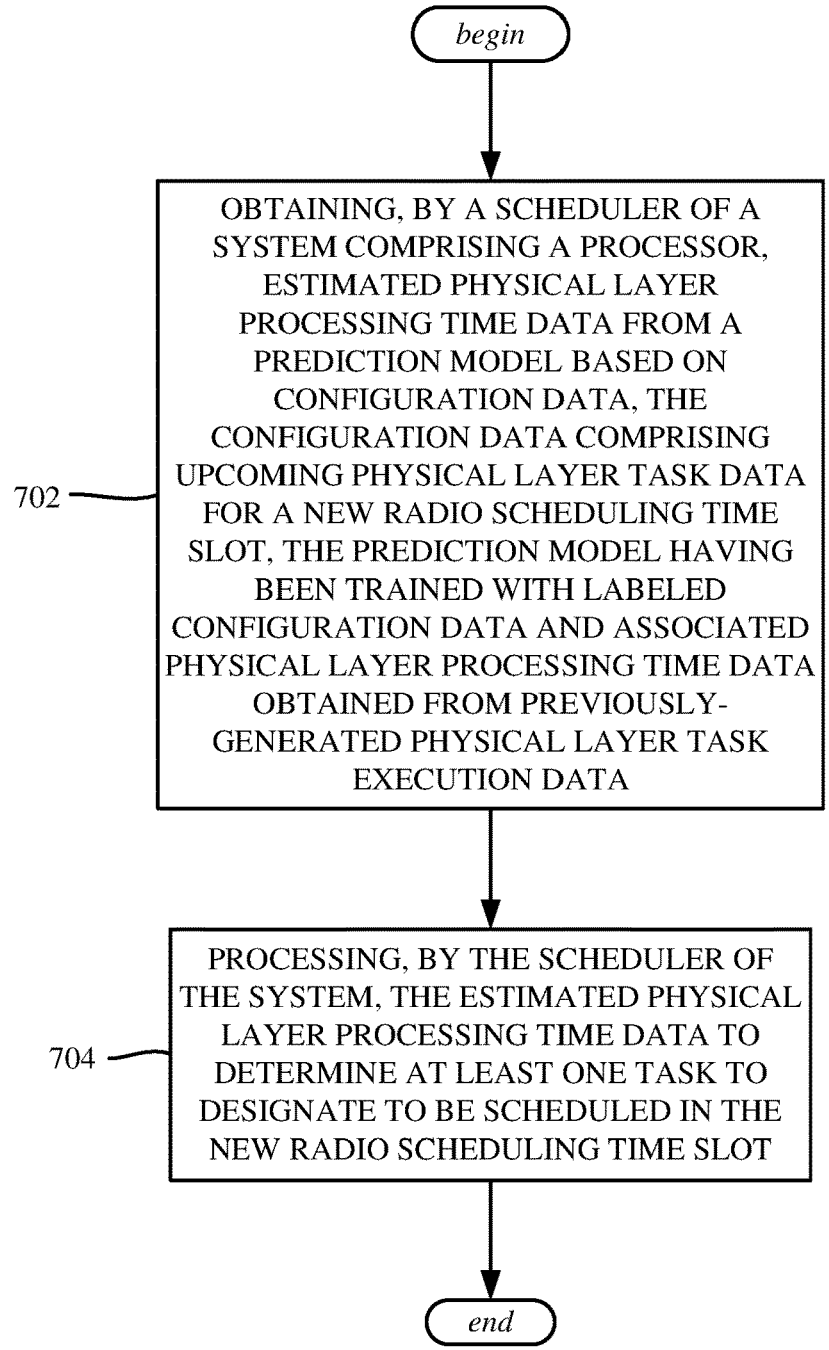
FIG. 7 is a flow diagram showing example operations related to processing of estimated physical layer processing time data to determine at least one task to be scheduled in a scheduling time slot, in accordance with various aspects and implementations of the subject disclosure.

One or more example aspects, such as corresponding to example operations of a method, are represented in FIG. 7. Example operation 702 represents obtaining, by a scheduler of a system comprising a processor, estimated physical layer processing time data from a prediction model based on configuration data, the configuration data comprising upcoming physical layer task data for a new radio scheduling time slot, the prediction model having been trained with labeled configuration data and associated physical layer processing time data obtained from previously-generated physical layer task execution data. Example operation 704 represents processing, by the scheduler of the system, the estimated physical layer processing time data to determine at least one task to designate to be scheduled in the new radio scheduling time slot.

Further operations can include inputting, by the system to the prediction model, the configuration data as a sequence of respective configurations corresponding to respective consecutive time slots; the estimated physical layer processing time data can include a sequence of respective estimated physical layer processing times for the respective consecutive time slots.

Processing the estimated physical layer processing time data by the scheduler to determine the scheduling decision can include determining a task group based on the task data and the processing time data; the task group can include one or more tasks that are executable by a physical layer based on constraint data of the physical layer, and scheduling the task group in the new radio scheduling time slot.

Processing the estimated physical layer processing time data by the scheduler to determine the scheduling decision can include determining candidate task groups based on the task data and the processing time data, each candidate task group comprising one or more tasks that are executable by a physical layer based on real time constraint data of the physical layer, and selecting a selected task group from the candidate task groups based on which task group of the candidate task groups most closely approaches a capacity limit of the physical layer.

Processing the estimated physical layer processing time data by the scheduler to determine the scheduling decision can include determining candidate task execution hypotheses representing arrangements of one or more tasks, and testing, by the scheduler, the task execution hypotheses to determine which arrangement is executable by a physical layer while satisfying a defined constraint data of a physical layer and is executable to most closely approach a capacity limit of the physical layer.

Figure 8:
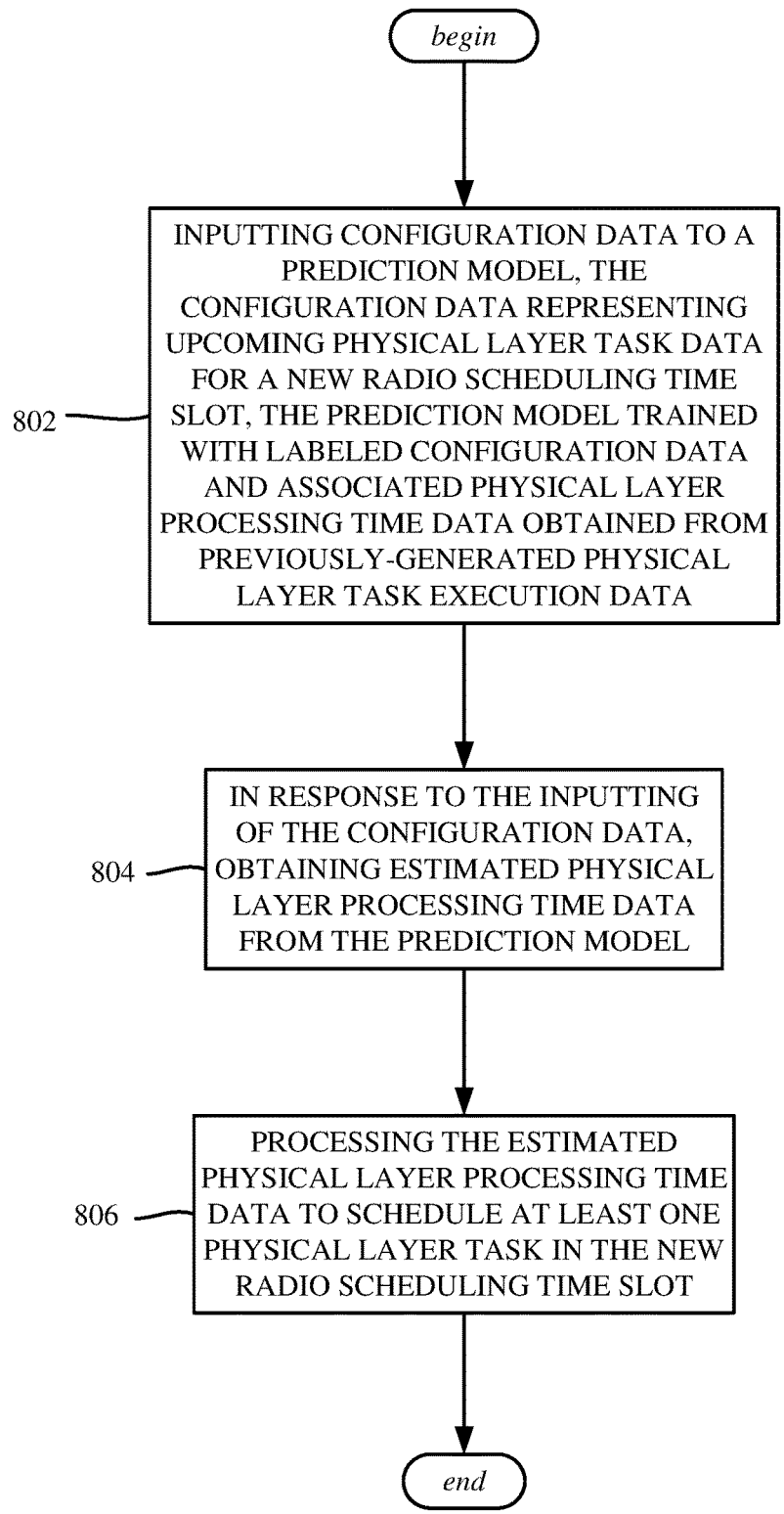
FIG. 8 is a flow diagram showing example operations related to obtaining estimated physical layer processing time data from a prediction model and processing the estimated physical layer processing time data to schedule at least one physical layer task, in accordance with various aspects and implementations of the subject disclosure.

FIG. 8 summarizes various example operations, e.g., corresponding to a machine-readable medium, comprising executable instructions that, when executed by a processor, facilitate performance of operations. Example operation 802 represents inputting configuration data to a prediction model, the configuration data representing upcoming physical layer task data for a new radio scheduling time slot, the prediction model trained with labeled configuration data and associated physical layer processing time data obtained from previously generated physical layer task execution data. Example operation 804 represents, in response to the inputting of the configuration data, obtaining estimated physical layer processing time data from the prediction model. Example operation 806 represents processing the estimated physical layer processing time data to schedule at least one physical layer task in the new radio scheduling time slot.

Processing the estimated physical layer processing time data can include determining candidate task execution hypotheses representing arrangements of one or more tasks, and testing the task execution hypotheses to determine which arrangement is executable to satisfy constraint data of a physical layer, and is executable to most closely approach a physical layer capacity limit.

The configuration data can include a sequence of respective configurations corresponding to respective consecutive time slots; the estimated physical layer processing time data can include a sequence of respective estimated physical layer processing times for the respective consecutive time slots, and further operations can include processing the estimated physical layer processing time data to schedule a sequence of tasks of the respective configurations for first execution in the new radio scheduling time slot and second execution in at least one other scheduling time slot of the respective consecutive time slots other than the new radio scheduling time slot.

As can be seen, the technology described herein facilitates accurate prediction of PHY's processing time via a trained ML model. With the knowledge of the processing time, a real-time MAC scheduler is able to determine which tasks to be scheduled can be processed on time, including verifying that the processing load (capacity) is below the maximum load the PHY can handle. This allows more fully utilizing the PHY, instead of having the PHY be in an idle state a significant percentage of time (underutilized). For example, instead of incorporating a margin of safety by targeting the load to be below a hard limit (e.g., eighty percent of the maximal capacity as an example) at any given time, detailed profiling information obtained via the AI/ML model can reduce this margin (e.g., increase the threshold percentage of the maximal capacity to a percentage in the high nineties), increasing average utilization. More resources can be utilized, for example to increase uplink link reliability by increasing the number of decoder iterations (low-density parity-check in NR or Turbo in LTE) leading to lower block error rate (BLER) in the same conditions.

The higher PHY utilization as described herein can enhance system capabilities and/or reduce deployment costs. Depending on the use-case, related resources can be used to increase throughput, reliability of the communication link, or a combination of both. If related resources are not utilized, they can help reduce energy consumption by transitioning the core or server to an idle state, better optimize CAPEX and/or OPEX, or improve any other relevant metric for the considered use-case.

Figure 9:
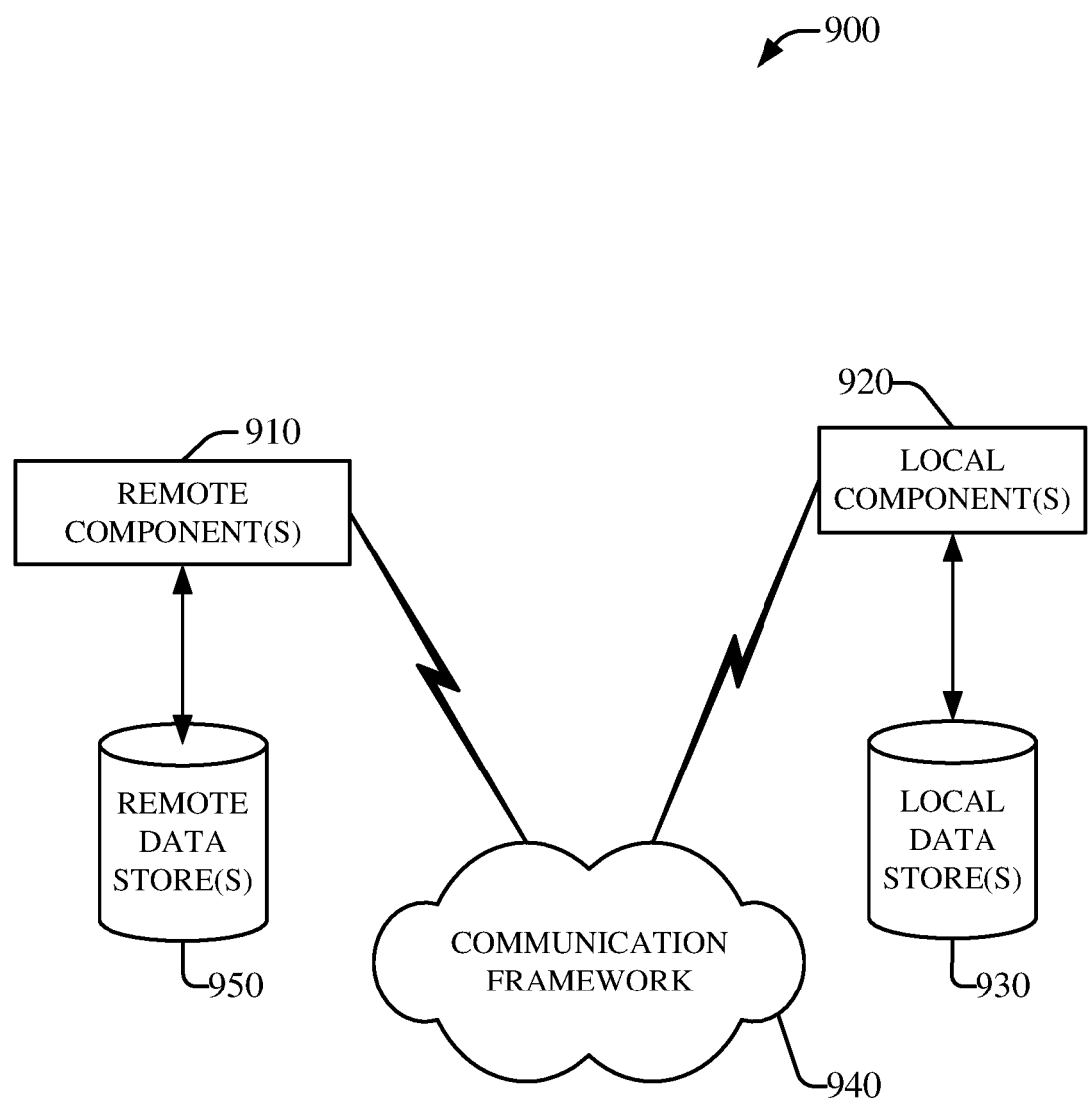
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
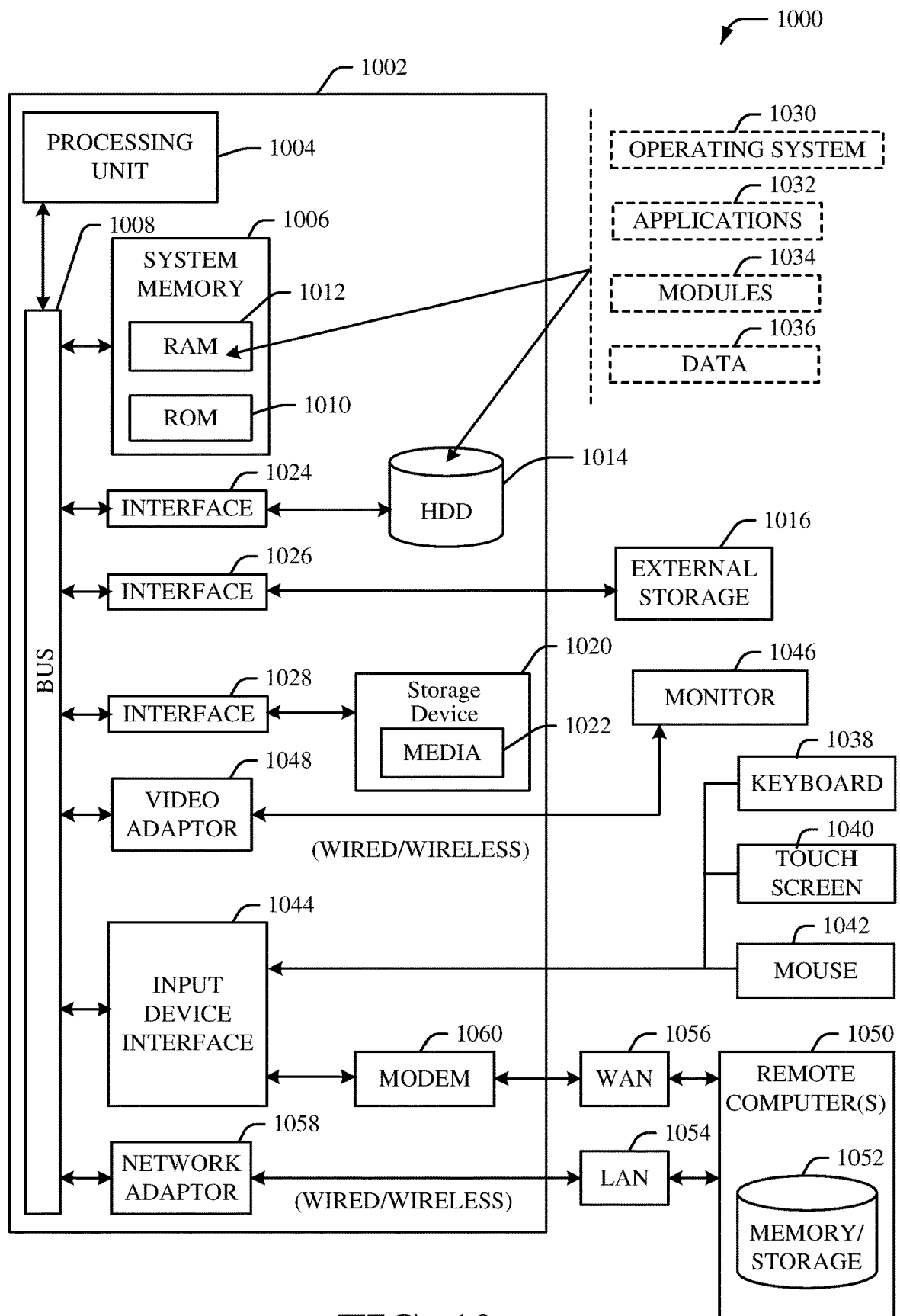
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
at least one processor; and
at least one memory that stores executable instructions that, when executed by the at least one processor, facilitate performance of operations, the operations comprising:
inputting configuration data to a prediction model, the configuration data representing upcoming physical layer task data for a new radio scheduling time slot, the prediction model trained with labeled configuration data and associated physical layer processing time data obtained from previously-generated physical layer task execution data; and
in response to the inputting of the configuration data, outputting, from the prediction model based on the configuration data, estimated physical layer processing time data,
wherein the prediction model comprises a regression model or a deep neural network.

2. The network equipment of claim 1, wherein the outputting of the estimated physical layer processing time data comprises determining the estimated physical layer processing time data based at least in part on at least one previously scheduled task that has not yet executed.

3. The network equipment of claim 1, wherein the inputting of the configuration data comprises inputting a sequence of respective configurations corresponding to respective consecutive time slots to the prediction model, and wherein the outputting of the estimated physical layer processing time data comprises outputting a sequence of respective estimated physical layer processing times for the respective consecutive time slots.

4. The network equipment of claim 1, wherein the operations further comprise obtaining the estimated physical layer processing time data at a scheduler, and evaluating the estimated physical layer processing time data by the scheduler to determine a scheduling decision comprising at least one task to schedule in the new radio scheduling time slot.

5. The network equipment of claim 1, wherein the evaluating of the estimated physical layer processing time data comprises testing a group of task execution hypotheses representing arrangements of one or more candidate tasks.

6. The network equipment of claim 5, wherein the testing of the group of task execution hypotheses comprises determining which ones of the arrangements of the one or more candidate tasks are executable within at least one of: time constraints of a physical layer, or energy constraints of the physical layer.

7. The network equipment of claim 5, wherein the testing of the group of task execution hypotheses comprises determining which ones of the arrangements of the one or more candidate tasks most closely approaches a capacity limit of a physical layer.

8. The network equipment of claim 5, wherein the testing of the group of task execution hypotheses comprises determining a subgroup of the arrangements of the one or more candidate tasks that are executable within constraints of a physical layer, and determining which ones of the subgroup of the arrangements of the one or more candidate tasks most closely approaches a capacity limit of the physical layer.

9. The network equipment of claim 1, wherein the operations further comprise updating the prediction model via reinforcement learning.

10. The network equipment of claim 9, wherein the updating of the prediction model via reinforcement learning comprises at least one of obtaining local feedback data of the network equipment generated during runtime, or obtaining non-local feedback data from at least one other data source other than data sources comprising the local feedback data.

11. A method, comprising:
obtaining, by a scheduler of a system comprising at least one processor, estimated physical layer processing time data from a prediction model based on configuration data, the configuration data comprising upcoming physical layer task data for a new radio scheduling time slot, the prediction model having been trained with labeled configuration data and associated physical layer processing time data obtained from previously-generated physical layer task execution data; and
processing, by the scheduler of the system, the estimated physical layer processing time data to determine at least one task to designate to be scheduled in the new radio scheduling time slot,
wherein the prediction model comprises a regression model or a deep neural network.

12. The method of claim 11, further comprising inputting, by the system to the prediction model, the configuration data as a sequence of respective configurations corresponding to respective consecutive time slots, wherein the estimated physical layer processing time data comprises a sequence of respective estimated physical layer processing times for the respective consecutive time slots.

13. The method of claim 11, wherein the processing of the estimated physical layer processing time data by the scheduler to determine the at least one task to designate to be scheduled comprises determining a task group based on the task data and the processing time data, the task group comprising one or more tasks that are executable by a physical layer based on constraints of the physical layer, and scheduling the task group in the new radio scheduling time slot.

14. The method of claim 11, wherein the processing of the estimated physical layer processing time data by the scheduler to determine the at least one task to designate to be scheduled comprises:
determining candidate task groups based on the task data and the processing time data, each candidate task group comprising one or more tasks that are executable by a physical layer based on constraints of the physical layer, and
selecting a selected task group from the candidate task groups based on which task group of the candidate task groups most closely approaches a capacity limit of the physical layer.

15. The method of claim 11, wherein the processing of the estimated physical layer processing time data by the scheduler to determine the at least one task to designate to be scheduled comprises:
determining a candidate task execution hypotheses representing arrangements of one or more tasks, and
testing, by the scheduler, the candidate task execution hypotheses to determine which arrangement is executable by a physical layer while satisfying defined constraint data of a physical layer module and is executable to most closely approach a capacity limit of the physical layer.

16. A non-transitory machine-readable medium, comprising executable instructions that, when executed by at least one processor, facilitate performance of operations, the operations comprising:
inputting configuration data to a prediction model, the configuration data representing upcoming physical layer task data for a new radio scheduling time slot, the prediction model trained with labeled configuration data and associated physical layer processing time data obtained from previously-generated physical layer task execution data;

in response to the inputting of the configuration data, obtaining estimated physical layer processing time data from the prediction model; and processing the estimated physical layer processing time data to schedule at least one physical layer task in the new radio scheduling time slot, wherein the prediction model comprises a regression model or a deep neural network.

17. The non-transitory machine-readable medium of claim 16, wherein the processing of the estimated physical layer processing time data comprises determining candidate task execution hypotheses representing arrangements of one or more tasks, and testing the candidate task execution hypotheses to determine which arrangement is executable to satisfy constraint data of a physical layer, and is executable to most closely approach a physical layer capacity limit.

18. The non-transitory machine-readable medium of claim 16, wherein the configuration data comprises a sequence of respective configurations corresponding to respective consecutive time slots, wherein the estimated physical layer processing time data comprises a sequence of respective estimated physical layer processing times for the respective consecutive time slots, and wherein the operations further comprise processing the estimated physical layer processing time data to schedule a sequence of tasks of the respective configurations for first execution in the new radio scheduling time slot and second execution in at least one other scheduling time slot of the respective consecutive time slots other than the new radio scheduling time slot.

19. The method of claim 11, further comprising:
updating, by the system, the prediction model via reinforcement learning.

20. The non-transitory machine-readable medium of claim 16, wherein the operations further comprise:
updating the prediction model via reinforcement learning.

* * * * *